United States Patent
Yamada

(10) Patent No.: US 9,551,564 B2
(45) Date of Patent: Jan. 24, 2017

(54) OPTICAL COHERENCE TOMOGRAPHY APPARATUS AND OPTICAL COHERENCE TOMOGRAPHY METHOD

(71) Applicant: CANON KABUSHIKI KAISHA, Tokyo (JP)

(72) Inventor: Tomohiro Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/919,836

(22) Filed: Jun. 17, 2013

(65) Prior Publication Data

US 2013/0278935 A1   Oct. 24, 2013

Related U.S. Application Data

(63) Continuation-in-part of application No. PCT/JP2013/051248, filed on Jan. 23, 2013.

(30) Foreign Application Priority Data

Jan. 31, 2012 (JP) .................................. 2012-018821
Jan. 22, 2013 (JP) .................................. 2013-009526

(51) Int. Cl.
*G01B 9/02* (2006.01)

(52) U.S. Cl.
CPC ....... *G01B 9/02091* (2013.01); *G01B 9/02004* (2013.01); *G01B 9/02044* (2013.01); *G01B 9/02069* (2013.01)

(58) Field of Classification Search
USPC .................................................. 356/479, 497
See application file for complete search history.

(56) References Cited

U.S. PATENT DOCUMENTS

| | | | | |
|---|---|---|---|---|
| 3,914,055 A * | 10/1975 | Wolga | .................. | G01J 3/1256 356/301 |
| 7,554,668 B2 * | 6/2009 | Zhou et al. | .................. | 356/479 |
| 7,570,364 B2 * | 8/2009 | Kuroiwa | ............ | G01N 21/4795 356/479 |
| 2002/0097402 A1 * | 7/2002 | Manning | ....................... | 356/451 |
| 2005/0083533 A1 * | 4/2005 | Atia | .......................... | G01J 3/10 356/454 |
| 2006/0072632 A1 * | 4/2006 | Flanders | ............... | G01J 1/4257 372/20 |
| 2006/0232783 A1 * | 10/2006 | Choma et al. | ................ | 356/479 |

(Continued)

FOREIGN PATENT DOCUMENTS

JP    2007024677 A    2/2007
JP    2008275528 A    11/2008

(Continued)

*Primary Examiner* — Tarifur Chowdhury
*Assistant Examiner* — Jonathon Cook
(74) *Attorney, Agent, or Firm* — Canon USA Inc., IP Division

(57) ABSTRACT

An OCT apparatus includes a wavelength selector provided on an optical path between a light source unit and a pair of optical detection units, and having a wavelength selectivity with equal wavenumber intervals. A differential detection unit detects a differential between two interference lights detected by the two optical detection units, and an information acquisition unit obtains peak values in the temporal waveform of the intensity of the interference lights and acquires information about an object on the basis of the obtained peak values.

18 Claims, 11 Drawing Sheets

(56) References Cited

U.S. PATENT DOCUMENTS

| | | | |
|---|---|---|---|
| 2009/0261240 A1* | 10/2009 | Watanabe et al. | 250/252.1 |
| 2009/0273790 A1* | 11/2009 | Shimizu et al. | 356/495 |
| 2009/0316160 A1* | 12/2009 | Izatt et al. | 356/456 |
| 2011/0102802 A1* | 5/2011 | Izatt et al. | 356/479 |
| 2011/0273721 A1* | 11/2011 | Kulkarni et al. | 356/479 |

FOREIGN PATENT DOCUMENTS

| | | |
|---|---|---|
| JP | 2010032426 A | 2/2010 |
| JP | 2011206374 A | 10/2011 |

\* cited by examiner

FIG. 7

| TIME | $t_1$ | $t_2$ | $t_3$ | $t_4$ | $t_5$ | $t_6$ | $t_7$ | $t_8$ | $t_9$ | ----- | $t_{N-1}$ | $t_N$ |
|---|---|---|---|---|---|---|---|---|---|---|---|---|
| RECEIVED LIGHT VOLTAGE | 0 | 1 | 10 | 0 | 15 | 3 | 0 | 2 | 12 | ----- | 0 | 0 |

OPTICAL COHERENCE TOMOGRAPHY APPARATUS AND OPTICAL COHERENCE TOMOGRAPHY METHOD

CROSS-REFERENCE TO RELATED APPLICATIONS

This application is a Continuation of International Patent Application No. PCT/JP2013/051248, filed Jan. 23, 2013, which claims the benefit of Japanese Patent Application No. 2012-018821, filed Jan. 31, 2012 and No. 2013-009526 filed Jan. 22, 2013, all of which are hereby incorporated by reference herein in their entirety.

TECHNICAL FIELD

The present invention relates to on optical coherence tomography apparatus and an optical coherence tomography method.

BACKGROUND ART

In an optical coherence tomography (OCT) apparatus (hereinafter abbreviated as an OCT apparatus) of the related art using a tunable light source, an object is irradiated with light, the wavelength of the irradiation light is continuously changed, and reference light is caused to interfere with reflected light components returning from portions of the object having different depths. By analyzing frequency components included in a temporal waveform of intensity of interference light (hereinafter abbreviated as an interference spectrum), a tomographic image of the object is obtained. The frequency components are analyzed by subjecting the interference spectrum to Fourier transform processing. To obtain a tomographic image that has little distortion and noise, it is necessary to sample the interference spectrum at equal wavenumber intervals and to subject to the interference spectrum to Fourier transform processing.

In the related art, to sample the interference spectrum at equal wavenumber intervals, the timing of wavenumber selection is determined by separating part of the irradiation light and monitoring the part with a detector via an interferometer such as an etalon. In this way, a system for determining the timing of wavenumber selection (a k-trigger generating unit) and a system for detecting the intensity of interference light (a measuring system) are separately provided, and sampling is performed by synchronizing the systems. More specifically, the k-trigger generating unit inputs k-trigger signals (sampling triggers) to the measuring system at equal wavenumber intervals, whereby the interference spectrum is sampled at equal wavenumber intervals (see PTL 1).

CITATION LIST

Patent Literature

PTL 1: Japanese Patent Laid-Open No. 2007-24677

However, since the k-trigger generating unit and the measuring system are separately provided in the OCT apparatus of the related art, as described above, the k-trigger generating unit needs to input trigger signals to the measuring system for sampling. Consequently, timing errors due to multiple electric devices are likely to accumulate, and this makes high-accuracy synchronization difficult.

SUMMARY OF INVENTION

An optical coherence tomography apparatus (OCT apparatus) according to the present invention includes a light source unit configured to change a wavelength of light, an interference optical system configured to split the light from the light source unit into irradiation light to be applied to an object and reference light and to generate interference light between reflected light of the light applied to the object and the reference light, an optical detection unit configured to receive the interference light, and an information acquisition unit configured to acquire information about the object on the basis of a temporal waveform of an intensity of the interference light. The optical coherence tomography apparatus further includes a wavelength selector provided on an optical path between the light source unit and the optical detection unit and having a wavelength selectivity with equal wavenumber intervals. The information acquisition unit obtains peak values in the temporal waveform of the intensity of the interference light and acquires the information about the object on the basis of the obtained peak values.

Further features of the present invention will become apparent from the following description of exemplary embodiments with reference to the attached drawings.

BRIEF DESCRIPTION OF DRAWINGS

FIG. 7 illustrates exemplary data on received light voltage stored in a memory in the first embodiment of the present invention.

DESCRIPTION OF EMBODIMENTS

Figure 1:
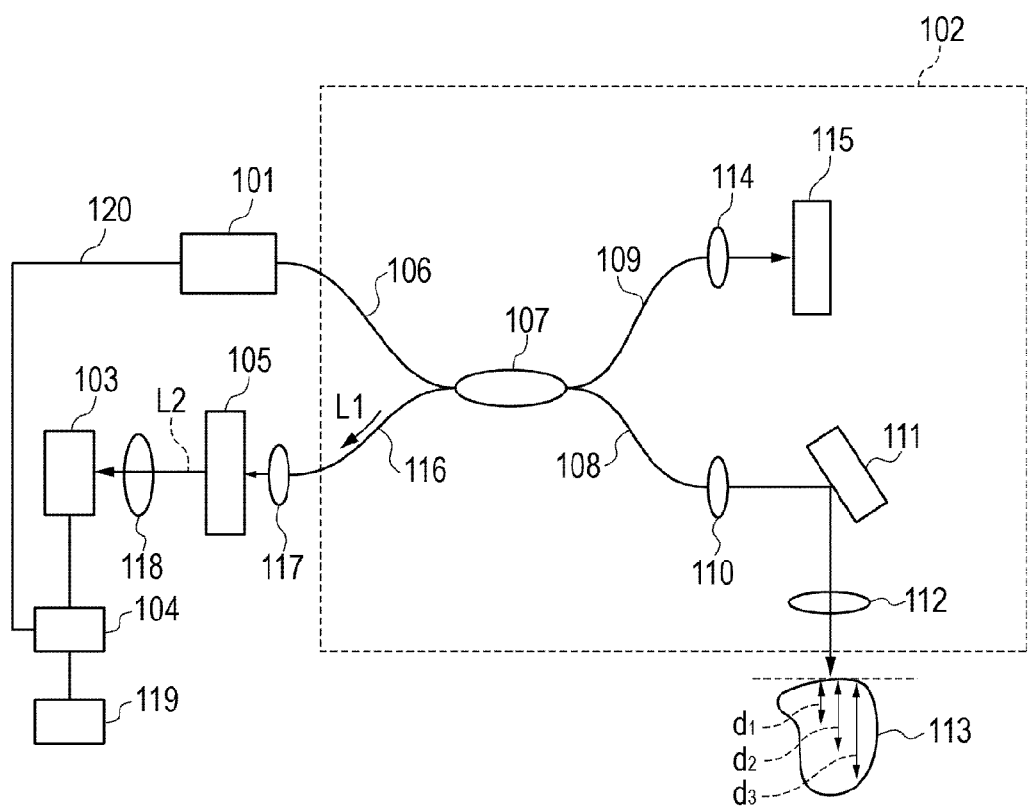
FIG. 1 illustrates a configuration of an OCT apparatus according to a first embodiment of the present invention.

While an optical coherence tomography apparatus (hereinafter abbreviated as an OCT apparatus) according to embodiments of the present invention will be described below, the present invention is not limited thereto.

First Embodiment

OCT Apparatus

An OCT apparatus according to a first embodiment will be described with reference to FIGS. 1 and 2. In the figures, arrows indicate directions in which light travels.

The OCT apparatus according to the first embodiment includes at least a light source unit 101, an interference optical system 102, an optical detection unit 103, an information acquisition unit 104, and a wavelength selector 105 having a wavelength selectivity with equal wavenumber intervals. Although not illustrated, the information acquisition unit 104 acquires information about an object to be measured. Further, the information acquisition unit 104 preferably includes a Fourier transformer. A manner in which the information acquisition unit 104 includes a Fourier transformer is not particularly limited as long as the information acquisition unit has a function of subjecting input data to Fourier transform processing. As an example, the information acquisition unit 104 includes an operation unit and the operation unit has a Fourier transform function. More specifically, the operation unit is a computer including a CPU, and the computer includes an application having a Fourier transform function. As another example, the information acquisition unit 104 includes a Fourier transform circuit having a Fourier transform function. Light emerging from the light source unit 101 passes through the interference optical system 102, and is output as interference light including information about an object 113 to be measured. The interference light passes through the wavelength selector having a wavelength selectivity with equal wavenumber intervals (hereinafter simply referred to as a wavelength selector) 105, and is received by the optical detection unit 103 at equal wavenumber intervals. The optical detection unit 103 may be of a differential detection type or a simple intensity monitor type. Information about a temporal waveform of intensity of the interference light received at equal wavenumber intervals is transmitted from the optical detection unit 103 to the information acquisition unit 104. The information acquisition unit 104 obtains peak values in the temporal waveform of the intensity of the interference light received at equal wavenumber intervals, and subjects the peak values to Fourier transform processing to acquire information about the object 113 (for example, information about a tomographic image). Since information about the object can thus be acquired without using a k-trigger generating unit, high-accuracy synchronization can be performed. In the scope that achieves the object of the present invention, units other than the light source unit 101, the interference optical system 102, the optical detection unit 103, the information acquisition unit 104, and the wavelength selector 105 described here can be provided arbitrarily.

When the information acquisition unit 104 does not include a Fourier transformer, information about the object may be acquired using a maximum entropy method (MEM).

A detailed description will be given below of a process from when light is produced in the light source unit 101 to when information about a tomographic image of an object to be measured is acquired.

Light emerging from the light source unit 101, which changes the wavelength of the light, travels through a fiber 106, and enters a coupler 107, where it is split into irradiation light to pass through a fiber 108 for irradiation light and reference light to pass through a fiber 109 for reference light. The irradiation light is converted into parallel light while passing through a collimator 110, and is reflected by a mirror 111. The light reflected by the mirror 111 passes through a lens 112, is applied to the object 113, and is reflected by layers arranged in the object 113 in a depth direction. In contrast, the reference light passes through a collimator 114, and is reflected by a mirror 115. In the coupler 107, the reflected light from the object 113 and the reflected light from the mirror 115 are caused to interfere with each other. The interference light travels through a fiber 116, is converted into parallel light while passing through a collimator 117, and enters the wavelength selector 105.

Peaks at equal wavenumber intervals are superimposed on a spectrum of the interference light that has passed through the wavelength selector 105. For example, it is assumed that FIG. 2A shows a temporal waveform of intensity of interference light before the interference light enters the wavelength selector 105 (L1 in FIG. 1). In a case in which the wavenumber of light emerging from the light source unit 101 and the time have a linear relationship, when the temporal waveform of intensity of the interference light shown in FIG. 2A is sampled at equal intervals along the time axis, sampled data includes equal wavenumber intervals. However, when the wavenumber of light emerging from the light source unit 101 and the time do not have a linear relationship, sampled data does not include equal wavenumber intervals.

Accordingly, the wavelength selector 105 having a property such that the transmittance has maximum values at equal wavenumber intervals is used. For example, the wavelength selector 105 having a property such that the transmittance has maximum values of 1 at equal wavenumber intervals, as illustrated in FIG. 2B, can be used. On interference light passing through the wavelength selector 105 having such a property (L2 in FIG. 1), peaks at equal wavenumber intervals are superimposed (FIG. 2C). In the graph of FIG. 2C, the peak values are arranged at equal wavenumber intervals.

Figure 2A:
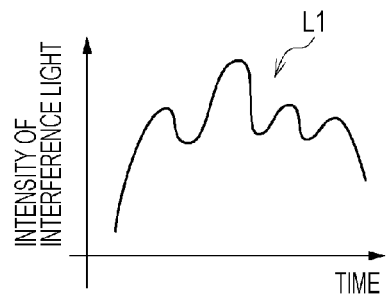
FIGS. 2A to 2E explain a method for obtaining peak values of intensity of interference light (received light voltage) BY the OCT apparatus according to the first embodiment of the present invention.

The interference light on which the peaks at the equal wavenumber intervals are superimposed is collected while passing through a collimator 118, and is received by the optical detection unit 103. Information about the intensity of the interference light received by the optical detection unit 103 is converted into electrical information such as voltage, and is transmitted to the information acquisition unit 104. The information acquisition unit 104 reads out peak values from the temporal waveform of the intensity of the interference light. Since the temporal waveform of the intensity of the interference light is actually converted into a temporal waveform of a received light voltage by the optical detection unit 103, peak values in the temporal waveform of the received light voltage are read out. For example, when the information acquisition unit 104 acquires information about a received light voltage having a temporal waveform shown in FIG. 2D, it reads out peak values shown by open circles in FIG. 2D. By subjecting the read peak values to Fourier transform processing with the Fourier transformer, information about a tomographic image of the object 113 is acquired. Values obtained by subjecting the peak values to Fourier transform processing correspond to frequency components included in the interference light, and the frequency components are proportional to the difference between the length of an optical path, which extends from the coupler 107, is reflected by the object surface, and reaches the coupler 107, and the length of an optical path which extends from the coupler 107, is reflected by the mirror 115, and reaches the coupler 107. Therefore, as information about the tomographic image of the object 113, for example, information about the relationship between the length from the object surface in the depth direction and the intensities of reflected light components from the layers in the object 113 can be obtained (FIG. 2E).

Information about the tomographic image may be transmitted from the information acquisition unit 104 to an image display unit 119 so as to be displayed as an image. By scanning the mirror 111 in a plane perpendicular to an incident direction of irradiation light, a three-dimensional tomographic image of the object 113 to be measured can be obtained. The light source unit 101 may be controlled by the information acquisition unit 104 via an electric circuit 120. Although not illustrated, the intensity of light emerging from the light source unit 101 may be sequentially monitored and data on the intensity may be used to correct the amplitudes of signals indicating the intensity of the interference light.

In this way, in the OCT apparatus of this embodiment, since interference light passes through the wavelength selector 105 having a wavelength selectivity with equal wavenumber intervals, data on the temporal waveform of intensity of the interference light acquired by the optical detection unit 103 includes equal wavenumber intervals. That is, data on the intensity of the interference light acquired by the optical detection unit 103 is data arranged at equal wavenumber intervals, and information about the object is obtained by sampling peak values (open circles in FIG. 2D) and subjecting the peak values to Fourier transform processing. Therefore, a k-trigger generating unit that was needed before is unnecessary, timing errors are reduced, and high-accuracy synchronization can be performed.

It is satisfactory as long as the wavelength selector 105 is provided on an optical path between the light source unit 101 and the optical detection unit 103. For example, the wavelength selector 105 may be provided on an optical path between the light source unit 101 and the coupler 107, may be provided on an optical path between the coupler 107 and the mirror 115, or may be provided between the coupler 107 and the object 113. Preferably, the wavelength selector 105 is provided on an optical path between the interference optical system 102 and the optical detection unit 103, as illustrated in FIG. 1. This is because, when the wavelength selector 105 is provided between the light source unit 101 and the coupler 107, the amount of light incident from the light source unit 101 on the interference optical system 102 may decrease, and consequently, the intensity of interference light produced in the coupler 107 may decrease. Alternatively, this is because, when a specified amount of light is applied to the object 113 or the like, the amount of light the light source unit 101 is required to emit increases. Further, when the object 113 is a living object such as an eyeball, the intensity of reflected light from the object 113 is low. For this reason, if the wavelength selector 105 is provided between the coupler 107 and the object 113, the intensity of reflected light decreases further. When the wavelength selector 105 is provided between the coupler 107 and the mirror 115 or when the wavelength selector 105 is provided between the coupler 107 and the object 113, the wavelength selector 105 is inserted in only one arm of the interference optical system. In this case, noise caused by, for example, vibration of the wavelength selector 105 cannot be removed even when a differential detection system is used.

Peak Values

While peak values in this embodiment refer to maximum values of intensity of interference light (received light voltage), as long as the peak values are provided at equal wavenumber intervals, values near maximum values that are slightly shifted from the maximum values may be referred to as peak values.

Figure 2D:
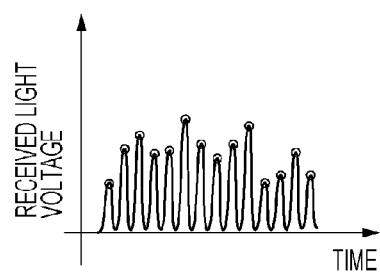
Figure 2B:
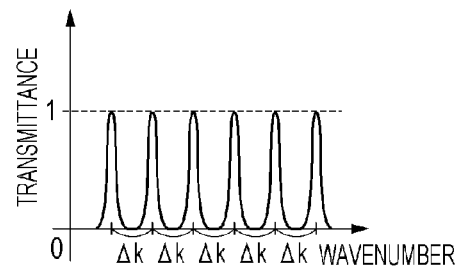
Figure 2E:
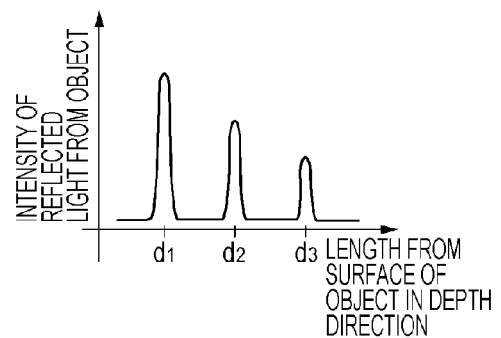

Here, when the wavelength selector 105 has a property such that the transmittance takes a value of 1 at equal wavenumber intervals and takes a value of 0 at other wavenumbers, only peak values of intensity of interference light (received light voltage), which are shown by open circles in FIG. 2D, are received (detected) by the optical detection unit 103, and the transmittance is 0 between the peaks. However, even when the transmittance of the actual wavelength selector 105 takes a value of 1 at equal wavenumber intervals, it takes a value between 0 and 1 at wavenumbers therebetween, as illustrated in FIG. 2B. For this reason, as illustrated in FIG. 2C, interference light other than the peak values is also received. Accordingly, it is necessary to read out maximum values of the peaks (open circles in FIG. 2D) as peak values. Although the highest transmittance of the actual wavelength selector is slightly lower than 1, for example, because of absorption of a medium, this point does not matter in the present invention.

Preferably, the number of peak values in the temporal waveform of intensity of the interference light to be obtained by the information acquisition unit 104 from a higher intensity side, of data on the temporal waveform of the intensity of the interference light received by the optical detection unit 103 corresponds to the number of maximum values of transmittance of the wavelength selector 105.

Wavelength Selector Having Wavelength Selectivity with Equal Wavenumber Intervals The wavelength selector of this embodiment is not particularly limited as long as it is an optical element or an optical system having a wavelength selectivity with equal wavenumber intervals. For example, a wavelength selector having maximum values of transmittance at equal wavenumber intervals can be used, as illustrated in FIG. 2B. Light passing through such a wavelength selector becomes light having peaks arranged at equal wavenumber intervals on a spectrum. Further, since the intensity of interference light (received light voltage) is sampled at the maximum values of transmittance, it is preferable that the linewidth of the peaks of the maximum values of transmittance be small. That is, when the wavelength selector is a Fabry-Perot filter, the filter preferably has a narrow band. This is because the intensity of interference light can be more accurately sampled at equal wavenumber intervals as the linewidth of the peaks of the maximum values of transmittance decreases. For example, when the frequency interval of light to be sampled is 18.7 GHz, the linewidth of the peaks of the maximum values of transmittance of the Fabry-Perot filter is preferably less than or equal to $\frac{1}{10}$ of the frequency interval, and more preferably less than or equal to $\frac{1}{100}$ thereof. This is realized by setting the reflectances of reflecting mirrors provided at both ends to constitute the Fabry-Perot filter at 75% or more and 97% or more, respectively. While the wavenumber intervals are preferably equally set, they may be different to an extent that can provide the advantageous effects of the present invention.

Further, the linewidth of the peaks of the maximum values of transmittance of the filter is preferably narrower than the linewidth of the light source.

The linewidth is represented by a wavelength width $\Delta\lambda$ or a frequency width $\Delta\nu$, and refers to the full width at half maximum or the full width at $1/e^2$ of the peak in an emission spectrum of the light source or in a transmittance spectrum of the filter. Hereinafter, the linewidth will be described as the full width at half maximum of the peak in the wavelength spectrum.

For example, when an OCT image of a bright object, such as a mirror, is used, the optical path length difference between the mirror and a reference mirror in the OCT interferometer is changed, and a coherence length Δz is defined by the optical path length difference such that the brightness of the OCT image is reduced by half, the linewidth Δλ of the light source can be found from Δz according to the following Equation (1):

$$\Delta\lambda = \frac{2\ln 2}{\pi} \times \frac{\lambda_0^2}{\Delta z} \quad (1)$$

By passing an interference signal through a filter having a peak width narrower than the linewidth of the light source, light having a linewidth narrower than the linewidth of the light source can be extracted from light included in the interference signal. In this case, the obtained interference signal is an interference signal between light components having a linewidth narrower than the linewidth of the light source.

In relation to the distance that allows the OCT image to be taken, the fact that the interference signal between light components having a narrow linewidth can be obtained provides an advantageous effect similar to that of the case in which light originally having a narrow linewidth is applied to an object and an interference spectrum is obtained by capturing reflected light from the object.

That is, when the linewidth of the filter is narrower than the linewidth of the original light source, the distance in the depth direction that allows the OCT image to be taken can be increased by cutting out interference light to a narrow band by the filter before the interference light is received.

For example, when it is assumed that a spectrum cut out by the filter has a substantially Gaussian shape and when Δλ represents the full width at half maximum of the peak wavelength of the filter and λ0 represents the emission wavelength, a depth range Δz in the depth direction that allows an image to be taken is expressed by the following Equation (2):

$$\Delta z = \frac{2\ln 2}{\pi} \times \frac{\lambda_0^2}{\Delta\lambda} \quad (2)$$

As is shown in the equation, the narrow linewidth of the peak of the filter means that Δλ in the above equation is small. Consequently, the range Δz that allows the OCT image to be taken becomes wide.

In general, it is difficult to realize a narrow linewidth light source itself that can sweep a wide wavelength range at high speed. Hence, development of such a high-performance light source sometimes makes a significant issue.

Therefore, according to the present invention, the requirement of the emission linewidth, of the above requirements for the light source, can be relaxed, and this is preferable because development of the light source is facilitated.

The type of the wavelength selector is not particularly limited, and an optical element such as a Fabry-Perot filter, or an optical system, such as a Mach-Zehnder interferometer or a Michelson interferometer, can be used. Alternatively, half mirrors opposed with an air gap being disposed therebetween may be used, or distributed Bragg reflectors (hereinafter sometimes abbreviated as DBRs) opposed to each other may be formed in an optical fiber. Among the wavelength selectors of this embodiment, a Fabry-Perot filter that easily increases the finesse is suitable. A Fabry-Perot etalon is given as an example of a Fabry-Perot filter.

Fabry-Perot Etalon

Figure 3:
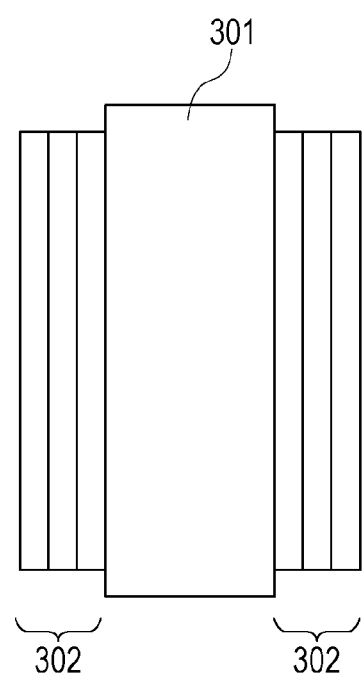
FIG. 3 illustrates an exemplary structure of a Fabry-Perot etalon in the first embodiment of the present invention.

A Fabry-Perot etalon will be described with reference to FIG. 3.

In an example of a Fabry-Perot etalon, DBRs 302 are provided on opposite surfaces of a glass substrate 301. DBRs are each formed by a plurality of dielectric films, and reflectance of the Fabry-Perot etalon can be changed by changing the number of dielectric films or the refractive indices of the dielectric films. When the reflectance increases, the finesse increases, and the wavelength selectivity with equal wavenumber intervals increases. The above-described glass substrate 301 is not particularly limited, and for example, BK7 can be used.

Optical Detection Unit

The optical detection unit in this embodiment will be described. The optical detection unit in this embodiment is not particularly limited as long as it converts the intensity of interference light into electric strength such as voltage. Information about a temporal waveform of the intensity of interference light is converted into information about a temporal waveform of a received light voltage by this optical detection unit. The information about the temporal waveform of the received light voltage is transmitted to the information acquisition unit that will be described next.

Information Acquisition Unit

Figure 4:
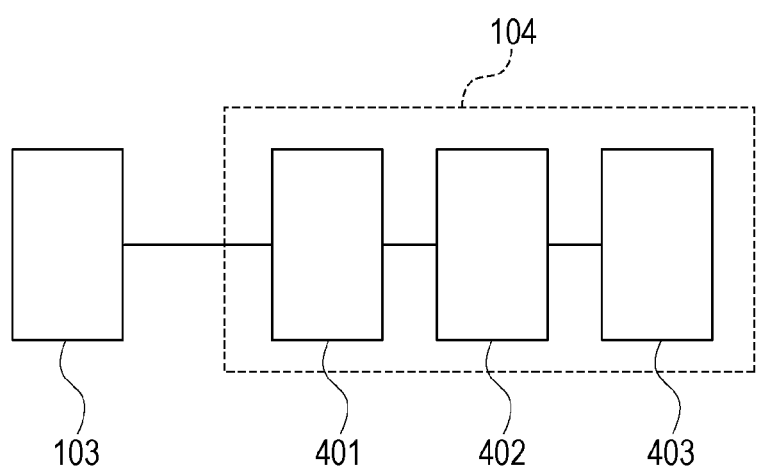
FIG. 4 illustrates a structure of an information acquisition unit in the first embodiment of the present invention.

An exemplary structure of the information acquisition unit 104 in this embodiment will be described with reference to FIG. 4. In the example of the information acquisition unit 104 of this embodiment, analog information about the temporal waveform of the received light voltage (information about the temporal waveform of the intensity of interference light) transmitted from the optical detection unit 103 is converted by an A/D converter 401 into digital information about the temporal waveform of the received light voltage. The digital information about the temporal waveform of the received light voltage is stored in a memory 402, and is transmitted to an operation unit 403. The operation unit 403 acquires information about the object 113 by obtaining peak values from the digital temporal waveform of the received light voltage and subjecting the peak values to Fourier transform processing. The information acquisition unit 104 includes a Fourier transformer.

Figure 5:
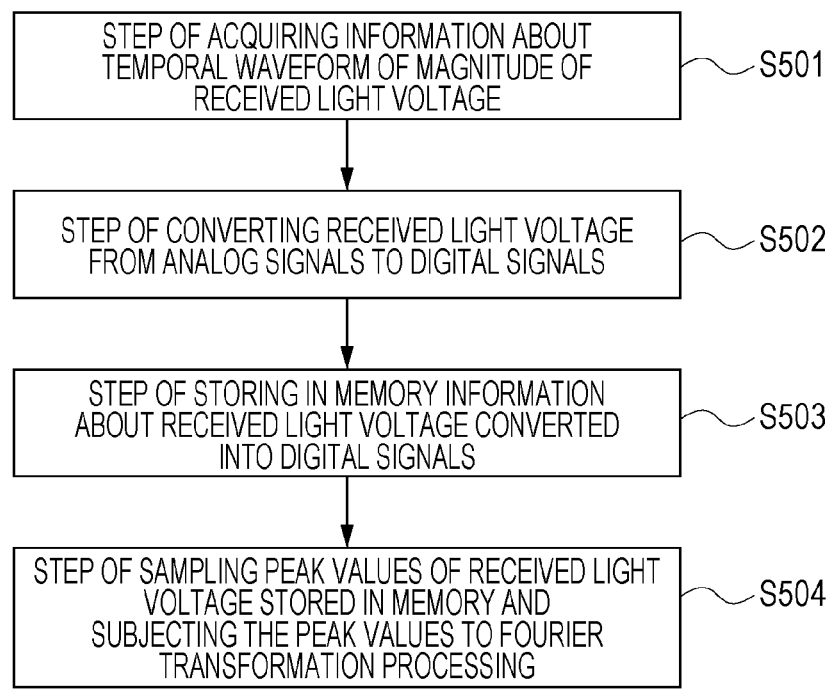
FIG. 5 illustrates a flow of steps performed by the information acquisition unit until a tomographic image of an object is obtained in the first embodiment of the present invention.
Figure 6A:
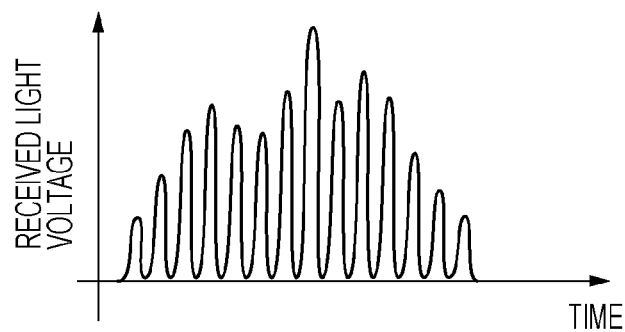
FIGS. 6A and 6B are graphs showing data on the magnitude of a received light voltage before and after the data is input to an A/D converter in the first embodiment of the present invention.
Figure 6B:
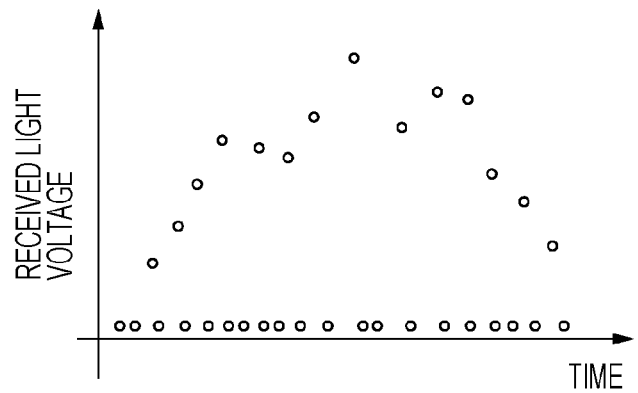

Next, an exemplary flow for acquiring information about the object 113 in the information acquisition unit 104 will be described in detail with reference to FIGS. 5 and 6. First, the optical detection unit 103 receives light and acquires information about a temporal waveform of a voltage (S501 in FIG. 5, FIG. 6A). Since the light has passed through the wavelength selector 105, the temporal waveform of the magnitude of the received light voltage includes equal wavenumber intervals. Next, the A/D converter 401 converts the received light voltage from analog signals to digital signals (S502 in FIG. 5, FIG. 6B). The information about the received light voltage (information about the intensity of interference light) converted into the digital signals is stored in the memory 402 (S503 in FIG. 5). This corresponds to storage of data shown by open circles in FIG. 6B. Peak values of the received light voltage stored in the memory 402 are sampled, and the peak values are subjected to Fourier transform processing by the operation unit 403. Through these steps, information about the object can be obtained.

While a method for sampling the peak values of the received light voltage stored in the memory 402 is not particularly limited, it is necessary to acquire significant maximum values different from noise. For example, a threshold value larger than noise is set, and maximum values larger than or equal to the threshold value can be extracted. As an exemplary processing method, in a case in which information about the magnitude of the received light voltage (interference light) stored in the memory is represented as in FIG. 7, when a received light voltage of 5 is set as a threshold value, a value of received light voltage more than or equal to the threshold value is regarded as a peak value.

A setting method for the threshold value is not limited to a specific method. For example, when an m-number of maximum values of transmittance of the wavelength selector 105 are present in a wavelength sweep band for acquiring signals, an m-number of maximum values from a larger side are selected from the maximum values included in the obtained temporal waveform of the magnitude of received light voltage. The largest value of the remaining maximum values, which are not selected, is regarded as the largest noise value. A value larger than the largest noise value and larger than or equal to the smallest value of the maximum values can be set as a threshold value.

When the light source unit 101 whose wavelength sweep speed is substantially constant, is used, times at which the light source unit 101 emits light with wavelengths corresponding to the maximum values of transmittance of the wavelength selector can be estimated from the intervals of the maximum values of transmittance of the wavelength selector 105. Further, the largest values of the maximum values included in the temporal waveform, which are obtained near the estimated times, can serve as peak values to be found. An m-number of peak values from a larger side can be selected from the peak values.

When the wavelength sweep speed of the light source unit 101 does not greatly change, the time interval of data should not greatly change. Therefore, when the time interval of data only between certain two points (between a time $t_2$ and a time $t_4$ in FIG. 8A) is about twice the time intervals of signals obtained at times near the times $t_2$ and $t_4$, as illustrated in FIG. 8, a received light voltage obtained at a time therebetween (a time $t_3$ in FIG. 8A) can be regarded as 0. Accordingly, sampling data is created by inserting 0 at the time $t_3$ in the sampling data. Such insertion of the value 0 is necessary particularly when interference signals are obtained by differential detection.

Figure 8A:
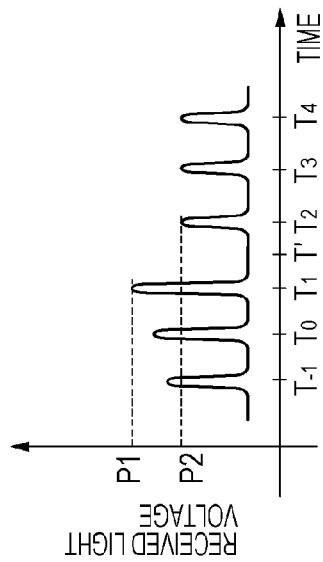
FIGS. 8A to 8D explain an example of a method for generating sampling data in the first embodiment of the present invention.
Figure 8B:
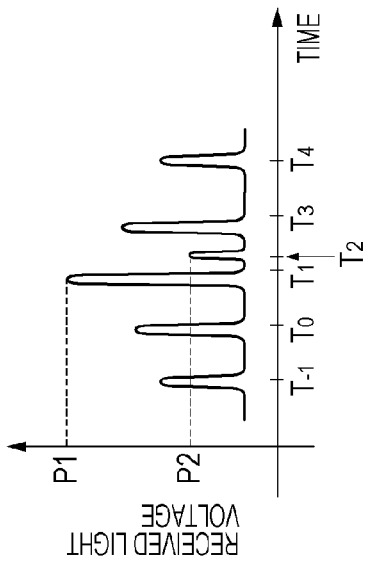

That is, in the information acquisition unit of this embodiment, when a time interval between a time $T_1$ when a peak value of magnitude of the received light voltage (a peak value of intensity of interference light) $P_1$ is obtained, and a time $T_2$, when a peak value $P_2$ is obtained, next to the time when the peak value $P_1$ is obtained, is more than or equal to 1.99 times, preferably, 1.9 times longer than an average time interval $\Delta T$ of time intervals of near peak values, operation may be performed to consider that the magnitude of received light voltage (intensity of interference light) at a time T' between the times $T_1$ and $T_2$ is 0 (FIG. 8B). This is because, when the wavelength sweep speed at the times $T_1$ and $T_2$ changes within a range of 10% of the wavelength sweep speed at the time $T_0$ or $T_3$, and when the time interval is more than or equal to 1.9 times longer than the average time interval $\Delta T$, the magnitude of received light voltage at the time T' can be considered to be 0. Similarly, when the wavelength sweep speed changes within a range of 1% and when the time interval is more than or equal to 1.99 times, the magnitude of the received light voltage can be considered to be 0.

For example, when the time interval is about twice (1.9 times or more and 2.1 times or less) longer than the average time interval, it is considered that the magnitude of the received light voltage (intensity of interference light) at the time T' between the times $T_1$ and $T_2$ is regarded as 0 (FIG. 8B).

For example, peripheral peak values include a peak value ($P_0$) at a time ($T_0$) previous to the time where the peak value $P_1$ is obtained, a peak value ($P_{-1}$) at a time ($T_{-1}$) before the previous time, a peak value ($P_3$) at the next time ($T_3$), and a peak value ($P_4$) at a time ($T_4$) after the next time. In this case, the average time interval $\Delta T$ of the time intervals in which the peripheral peak values are obtained can be an average of a value of $T_0-T_{-1}$ and a value of $T_4-T_3$. While the average time interval is calculated from four peak values, the number of peak values used for operation may be more than four.

When the time interval is about three times (2.9 times or more and 3.1 times or less) longer than the average time interval, it is considered that the intensity of interference light at times obtained by trisecting the time interval between the times $T_1$ and $T_2$ is 0. Similarly, when the time interval is about N times longer than the average time interval, it is considered that the intensity of interference light at times obtained by dividing the time interval between the times $T_1$ and $T_2$ into an N-number of equal parts is 0.

In a case in which there is the above-described point where the amplitude of the interference signal is 0, when the optical detection unit 103 is of a differential detection type, it outputs a voltage of 0, as described above. In contrast, when the optical detection unit is of a simple light intensity detection type, it detects the incoherent light amount and outputs a value that is not 0. Therefore, interpolation of the above value of 0 is a necessary operation when the optical detection unit 103 is of the differential detection type. Hence, for example, the above-described point where the interference component is 0 can be detected by performing measurement with both an optical detection unit of a differential detection type and a simple light intensity detector.

Figure 8C:
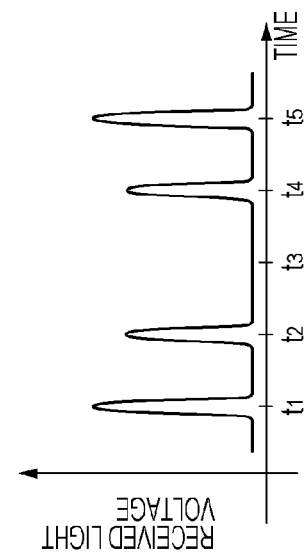

Data acquired at a time interval that is clearly shorter than the time intervals for other data, for example, data acquired at a time interval about half the time intervals of signals obtained at peripheral times is highly likely to be sampled at values other than the maximum values of transmittance of the wavelength selector 105 (FIG. 8C). In this case, the above-described data whose time interval is short (data obtained at a time $t_4$ in FIG. 8C) is deleted. Through these steps, an m-number of sampling data arranged at substantially equal time intervals can be created. When a plurality of data whose time intervals are short are present, they may be deleted by performing an operation of deleting data of a short time interval a plurality of times.

Figure 8D:
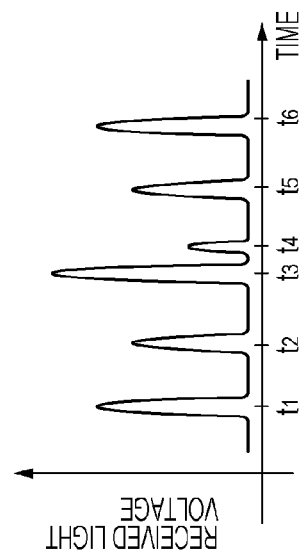

That is, when the time interval between the time $T_1$ when the peak value of magnitude of the received light voltage (peak value of intensity of interference light) $P_1$ is obtained and the time $T_2$ when the peak value $P_2$ is obtained next to the acquisition time of the peak value $T_1$ is 0.9 times or less longer than the average time interval $\Delta T$ of the time intervals when the peripheral peak values are obtained, the information acquisition unit of this embodiment does not need to acquire data on the peak value $P_2$ (FIG. 8D). Here, for example, the peripheral peak values include a peak value ($P_0$) at a time ($T_0$) previous to the time when the peak value $P_1$ is obtained, a peak value ($P_{-1}$) at a time ($T_{-1}$) before the previous time, a peak value ($P_3$) at the next time ($T_3$), and a peak value ($P_4$) at a time ($T_4$) after the next time. In this case, the average time interval $\Delta T$ of the time intervals when the peripheral peak values are obtained can be an average of a value of $T_0-T_{-1}$ and a value of $T_4-T_3$. While the average time interval is calculated from the four peak values, the number of peak values used for operation may be more than four.

Light Source Unit

In this embodiment, the light source unit 101 is not particularly limited as long as it is a light source that changes the wavelength of light. To acquire information about the object 113 using the OCT apparatus, it is necessary to continuously change the wavelength of light emerging from the light source unit.

As the light source unit 101 in this embodiment, for example, an external cavity type wavelength swept light source using a diffraction grating or a prism, and various external cavity type light sources using a cavity-length variable Fabry-Perot tunable filter can be used. Alternatively, an SSG-DBR that changes the wavelength using a sampled grating and a tunable MEMS-VCSEL can be used. Also, a fiber laser can be used. The fiber laser may be of a dispersion tuning type or a Fourier domain mode locked type.

An example of an external cavity type wavelength swept light source using a diffraction grating or a prism is a wavelength swept light source that continuously changes the wavelength. The wavelength swept light source disperses light with a diffraction grating provided in a resonator and emits the light by using a polygonal mirror or a striped reflecting mirror provided on a rotating disc.

Object

In this embodiment, an object refers to a target to be measured by the OCT apparatus of this embodiment, and the type thereof is not particularly limited. An example of an object is a living object such as an eyeball, skin, or a tooth.

Uses

The above-described OCT apparatus of this embodiment can be used for ophthalmic imaging for obtaining a tomographic image of the fundus of the eye, dental imaging, and dermatological imaging.

Second Embodiment

An OCT apparatus according to another embodiment will be described. Descriptions of constituent elements of the OCT apparatus of this embodiment common to the first embodiment are skipped.

Figure 2C:
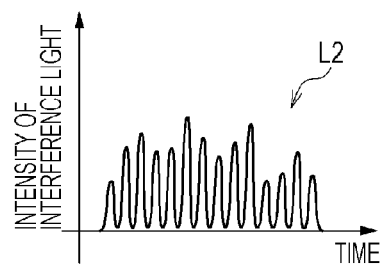
Figure 9:
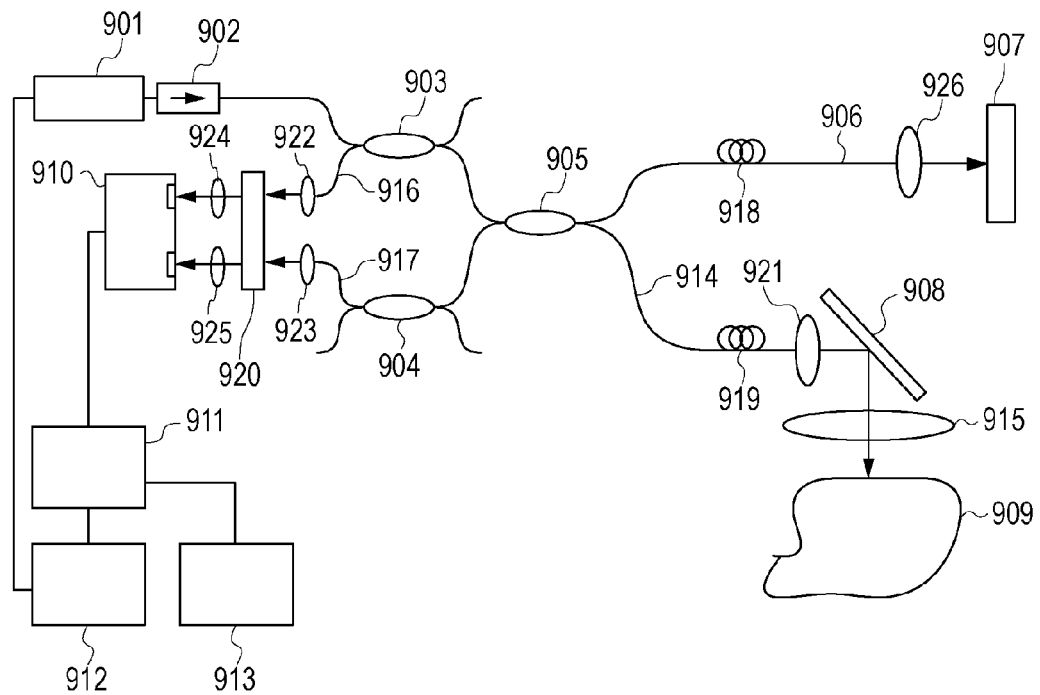
FIG. 9 illustrates a configuration of an OCT apparatus according to a second embodiment of the present invention.

While FIG. 1 illustrates a simple configuration of the OCT apparatus, for example, an optical system for differentially detecting interference signals may be configured, as illustrated in FIG. 9. In FIG. 9, there are arranged a tunable light source 901, an isolator 902, a reference-light optical-path fiber 906, a polarization controller 918, a fiber coupler 905 that splits light emitted from a light source into reference light and irradiation light, and a reflecting mirror 907. Further, an inspection-light optical-path fiber 914, a polarization controller 919, an irradiation-light collecting optical system 915, and an irradiation-position scanning mirror 908, which constitute a measuring unit for an object 909, are connected. In addition, a fiber coupler 903, a fiber coupler 904, a light-receiving fiber 916, a light-receiving fiber 917, and a differential detector 910 that constitute an optical detection unit, and a signal processing device 911 and an image output monitor 913 that constitute an information acquisition unit are connected. Further, a light-source control device 912 that constitutes a light source unit is connected, whereby an optical tomography apparatus can be configured. Reference numerals 921, 922, 923, 924, 925, and 926 denote collimators.

Since a Fabry-Perot filter 920 serving as a wavelength selector is provided on an upstream side of the differential detector 910, light detected by the differential detector 910 has equal wavenumber intervals. While one Fabry-Perot filter 920 is provided in FIG. 9, two Fabry-Perot filters may be provided, that is, one Fabry-Perot filter may be provided on an optical path between the collimator 922 and the collimator 924 and one Fabry-Perot filter may be provided on an optical path between the collimator 923 and the collimator 925. In this case, FSRs (free spectral ranges) of the two Fabry-Perot filters need to be equal. By thus using the differential detector 910 in the optical detection unit so that interference signals from two ports of an interference optical system are simultaneously input, common mode noise can be removed, and a tomographic image of an object with little noise can be obtained.

Third Embodiment

In a third embodiment, an optical coherence tomography method will be described. An optical coherence tomography method described below is just exemplary, and the present invention is not limited thereto.

Optical Coherence Tomography Method

The optical coherence tomography method of this embodiment uses the above-described optical coherence tomography apparatus, and includes at least a step of temporally changing the wavelength of light emerging from the light source unit, a step of receiving interference light produced in the interference optical system by the optical detection unit, and a step of acquiring information about the object on the basis of peak values in a temporal waveform of intensity of the received interference light. The step of acquiring the information about the object preferably includes a step of obtaining peak values in the temporal waveform of intensity of the interference light and subjecting the peak values to Fourier transform processing. When the information about the object is acquired, operation using a maximum entropy method may be performed instead of Fourier transform processing.

A step of transmitting data obtained by Fourier transform processing to the image display unit may be included. By including such a step, a tomographic image of an object to be measured can be displayed.

EXAMPLE

While an example of the present invention will be described below with reference to FIG. 1, the present invention is not limited thereto.

A configuration of an OCT apparatus according to this example is the same as that adopted in the above-described first embodiment. However, a wavelength swept light source is used as a light source unit 101, a photo detector (hereinafter abbreviated as PD) is used as an optical detection unit 103, and a Fabry-Perot etalon is used as a wavelength selector 105.

The wavelength swept light source sweeps wavelengths of 800 to 880 nm at a period of 5 ns, and repeats this operation. This corresponds to a sweep frequency of 200 kHz. In the OCT apparatus of this example, an optical path length from a point where light is emitted from the light source unit 101 to a mirror 115 is set to be equal to an optical path length from the point where the light is emitted from the light source unit 101 to a surface of an object 113, and a portion that extends for 4 mm from the surface of the object in an optical axis direction of irradiation light is observed.

Figure 10:
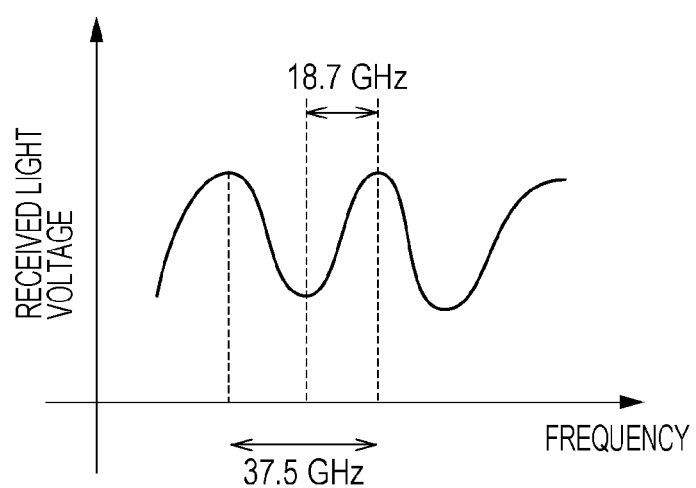
FIG. 10 explains the relationship between the received light voltage detected by a photo detector and the frequency in an example of the present invention.

When a single reflecting object is provided at a position at a distance of 4 mm from the surface of the object in the optical axis direction of the irradiation light, a spectrum of obtained interference intensity is a signal in which the intensity increases at a frequency interval of 37.5 GHz (FIG. 10). When this signal is regarded as a sine wave having a frequency of 37.5 GHz, the intensity of interference light needs to be sampled at a frequency interval at least less than or equal to half the above frequency interval in order to analyze frequency components of this signal. That is, sampling needs to be performed at a frequency interval of 18.75 GHz or less.

When it is assumed that the length of 4 mm from the surface of the object in the optical axis direction of the irradiation light is the maximum depth, the frequency of a signal whose frequency is to be analyzed is 37.5 GHz or less. Hence, by obtaining a signal at the frequency interval of 18.75 GHz or less, a signal in a frequency band necessary to obtain a tomographic image can be obtained.

In this example, this sampling interval is specified by the Fabry-Perot etalon inserted in the optical path. More specifically, the intervals of maximum values of transmittance of the Fabry-Perot etalon are set to be equal wavenumber intervals and to be less than 18.7 GHz. This corresponds to setting the optical path length of the Fabry-Perot etalon at 8 mm or more. In this example, the optical path length of the Fabry-Perot filter etalon is set at 8 mm. The optical path length may be more than 8 mm.

Figure 11:
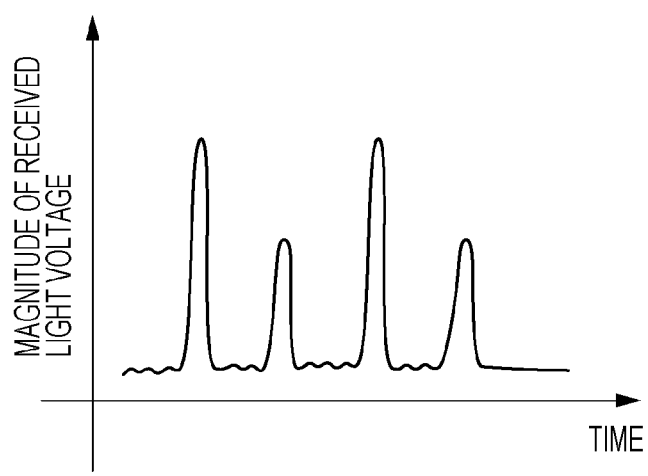
FIG. 11 illustrates a temporal waveform of a received light voltage obtained by an information acquisition unit in the example of the present invention.

Next, FIG. 11 illustrates a temporal waveform of the magnitude of a received light voltage obtained by using the PD in the OCT apparatus of this example. A signal obtained by the optical detection unit 103 has a waveform in which the transmittance of the Fabry-Perot filter is superimposed on a waveform of an interference signal. It is necessary to read out peak values in FIG. 11 and to acquire data using these peak values as signal values arranged at equal frequency intervals.

For that purpose, first, the temporal waveform of voltage magnitude obtained by optical detection is taken into a memory of an information acquisition unit 104 via an A/D converter. Next, peak values are read out from this data, and sampling data to be subjected to Fourier transform processing is created. Here, a threshold value is set for values more than or equal to noise, and maximum values higher than or equal to the threshold value are extracted.

In this example, the number m of maximum values of transmittance of the Fabry-Perot etalon is 1818. This is because the frequency interval between the wavelengths from 800 to 880 nm is 34.07 THz, in contrast, the frequency interval of the maximum values of transmittance of the Fabry-Perot etalon is 18.74 GHz, and the ratio thereof is 1818. Therefore, 1818 maximum values in data having high received light voltage received by the PD are used as sampling data and are subjected to Fourier transform processing, whereby a tomographic image of an object can be obtained.

According to the OCT apparatus of the present invention, light from a light source passes through the wavelength selector having a wavelength selectivity with equal wavenumber intervals, and is detected by the optical detection unit. As a result, data on intensity of interference light can be obtained at equal wavenumber intervals. Therefore, a k-trigger generating unit and a measuring system do not need to be provided as separate optical systems. Hence, timing errors are reduced, and high-accuracy synchronization can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An apparatus comprising:
   a light source unit configured to change a wavelength of light over time;
   an interference optical system configured to split the light from the light source unit into irradiation light to be applied to an object and reference light and to generate interference light between reflected light of the light applied to the object and the reference light;
   a light splitting unit configured to split the interference light into two interference lights;
   two optical detection units configured to receive the two interference lights;
   an information acquisition unit configured to acquire information about the object on the basis of a temporal waveform of an intensity of the interference lights;
   a wavelength selector provided on an optical path between an emission end surface of the light source unit and the two optical detection units, and having a wavelength selectivity with equal wavenumber intervals; and
   a differential detection unit configured to detect a differential between the two interference lights detected by the two optical detection units,
   wherein the information acquisition unit obtains peak values in the temporal waveform of the intensity of the interference lights and acquires the information about the object on the basis of the obtained peak values, and
   wherein the wavelength selector is a Fabry-Perot filter.

2. The apparatus according to claim 1, wherein the information acquisition unit includes a Fourier transformer configured to obtain the peak values in the temporal waveform of the intensity of the interference lights and to subject the peak values to Fourier transform processing.

3. The apparatus according to claim 1, wherein the wavelength selector is provided on an optical path between the interference optical system and the two optical detection units.

4. The apparatus according to claim 3, wherein a collimator is provided on an optical path of each of the interference lights between the wavelength selector and the two optical detection units.

5. The apparatus according to claim 1, wherein the wavelength selector includes maximum values of a transmittance at equal wavenumber intervals.

6. The apparatus according to claim 5, wherein a linewidth of the maximum values of the transmittance included in the wavelength selector is less than a linewidth of the light emitted from the light source unit.

7. The apparatus according to claim 1, wherein a number of peak values in the temporal waveform of intensity of the interference lights to be obtained by the information acquisition unit from a higher intensity side, of data on the temporal waveform of the intensity of the interference lights received by the two optical detection units, corresponds to a number of maximum values of transmittance of the wavelength selector.

8. The apparatus according to claim 1, wherein, when a time interval between a time $T_1$ when a peak value $P_1$ of the intensity of the interference lights is obtained, and a time $T_2$ when a peak value $P_2$ is obtained, next to the time when the peak value $P_1$ is obtained, is more than or equal to 1.9 times an average time interval $\Delta T$ of time intervals of adjacent peak values, the information acquisition unit performs operation such that the intensity of the interference lights at a time T' between the times $T_1$ and $T_2$ is regarded as 0.

9. The apparatus according to claim 1, wherein, when a time interval between a time $T_1$ when a peak value $P_1$ of the intensity of the interference lights is obtained, and a time $T_2$ when a peak value $P_2$ is obtained, next to the time when the peak value $P_1$ is obtained, is less than or equal to 0.9 times an average time interval $\Delta T$ of time intervals of adjacent peak values, the information acquisition unit does not acquire data on the peak value $P_2$.

10. An optical coherence tomography method using the optical coherence tomography apparatus according to claim 1, the method comprising:
    a step of temporally changing the wavelength of the light emerging from the light source unit;
    a step of receiving the interference light produced in the interference optical system by the optical detection unit; and
    a step of acquiring information about the object on the basis of the peak values in the temporal waveform of the intensity of the received interference light.

11. The optical coherence tomography method according to claim 10, wherein the step of acquiring the information about the object includes a step of obtaining the peak values in the temporal waveform of the intensity of the interference light and subjecting the peak values to Fourier transform processing.

12. The apparatus according to claim 1, wherein a collimator is provided on an optical path of each of the interference lights between the wavelength selector and the two optical detection units, and each of the optical detection units is configured to receive light from a respective collimator.

13. The apparatus according to claim 1, wherein a wavenumber of light emerging from the light source unit is not at an equal wavenumber intervals with respect to a sweep time.

14. The apparatus according to claim 1, wherein the light source unit is MEMS-VCSEL.

15. An apparatus comprising:
    a light source unit configured to change a wavelength of light over time;
    an interference optical system configured to split the light from the light source unit into irradiation light to be applied to an object and reference light and to generate interference light between reflected light of the light applied to the object and the reference light;
    a light splitting unit configured to split the interference light into two interference lights;
    two optical detection units configured to receive the two interference lights;
    an information acquisition unit configured to acquire information about the object on the basis of a temporal waveform of an intensity of the interference lights;
    a wavelength selector provided on an optical path between the light source unit and the two optical detection units and having a wavelength selectivity with equal wavenumber intervals; and
    a differential detection unit configured to detect a differential between the two interference lights detected by the two optical detection units,
    wherein the information acquisition unit obtains peak values in the temporal waveform of the intensity of the interference lights and acquires the information about the object on the basis of the obtained peak values,
    wherein a collimator is provided on an optical path of each of the interference lights between the light source unit and the wavelength selector, and
    wherein the wavelength selector is configured to receive light from the collimator provided on the optical path of each of the interference lights.

16. An apparatus comprising:
    a light source unit configured to change a wavelength of light over time;
    an interference optical system configured to split the light from the light source unit into irradiation light to be applied to an object and reference light and to generate interference light between reflected light of the light applied to the object and the reference light;
    a light splitting unit configured to split the interference light into two interference lights;
    two optical detection units configured to receive the two interference lights;
    an information acquisition unit configured to acquire information about the object on the basis of a temporal waveform of an intensity of the interference lights;
    a wavelength selector provided on an optical path between an emission end surface of the light source unit and the two optical detection units, and having a wavelength selectivity with equal wavenumber intervals; and
    a differential detection unit configured to detect a differential between the two interference lights detected by the two optical detection units,
    wherein the information acquisition unit obtains peak values in the temporal waveform of the intensity of the interference lights and acquires the information about the object on the basis of the obtained peak values, and
    wherein the wavelength selector is provided on an optical path between the interference optical system and the two optical detection units.

17. The apparatus according to claim 16, wherein a wavenumber of light emerging from the light source unit is not at an equal wavenumber intervals with respect to a sweep time.

18. The apparatus according to claim 16, wherein light source unit is MEMS-VCSEL.

* * * * *